United States Patent Office 2,965,694
Patented Dec. 20, 1960

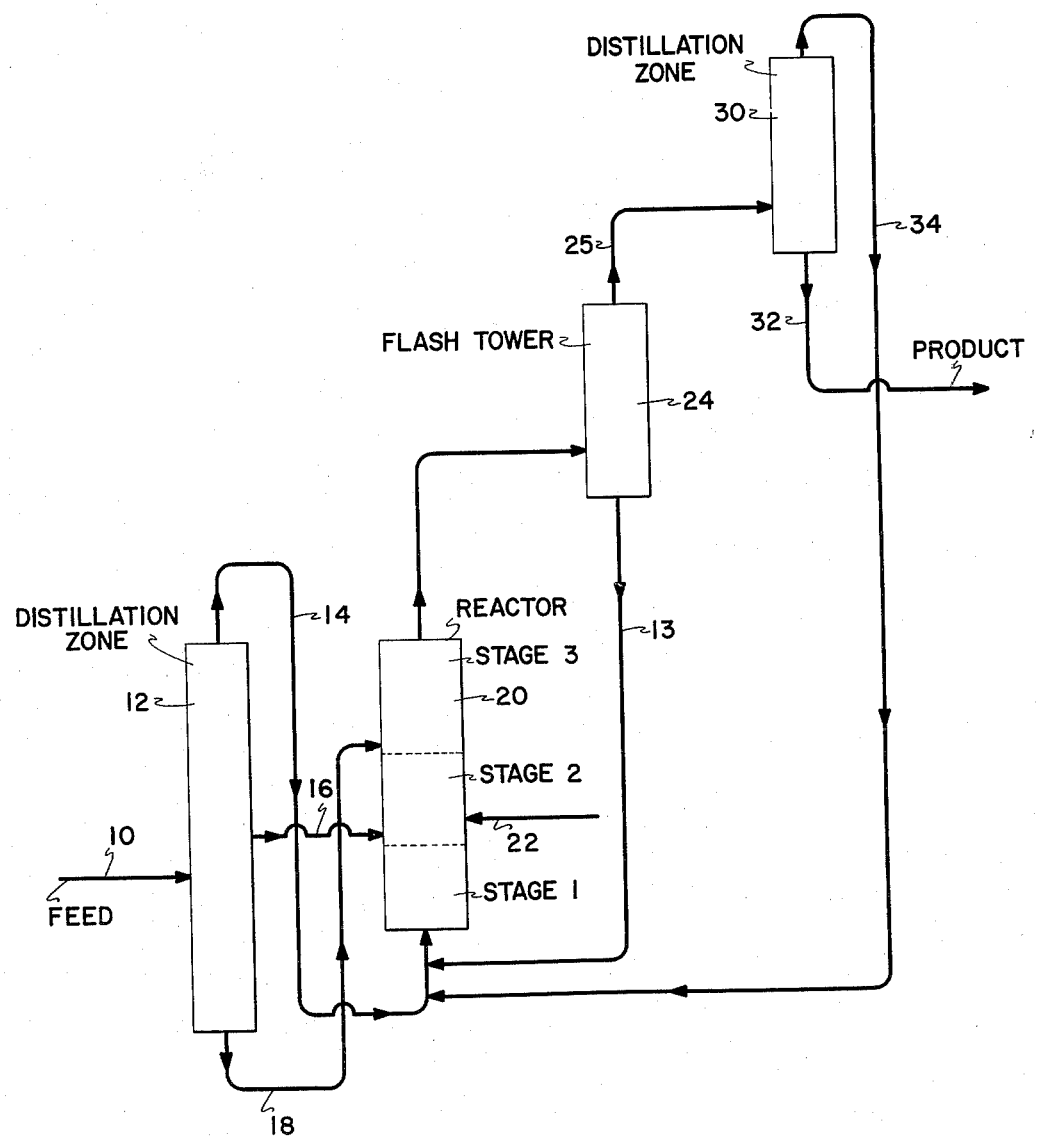

2,965,694
PROCESS FOR ISOMERIZING NAPHTHAS

Hugh Erwin Stanley, Peter Haynes Watkins, Richard Franklin Stringer, and Michael Francis McDonald, Sr., all of Baton Rouge, La., assignors to Esso Research and Engineering Company, a corporation of Delaware Filed May 12, 1959, Ser. No. 812,613

5 Claims. (Cl. 260—683.67)

This invention concerns improvements in the catalytic isomerization of paraffin hydrocarbons. More particularly, the invention relates to improvements in the liquid phase conversion of normal or slightly branched chain hydrocarbons of from 5 to 7 carbon atoms to commercially valuable, more highly branched isomers, employing aluminum bromide as the catalyst.

It is well known that the more highly branched isomers of the paraffinic hydrocarbons occurring in petroleum gasoline fractions are more valuable than the corresponding slightly branched or straight chain hydrocarbons because of their higher octane ratings. The demand for motor fuels of greater octane number has increased markedly as the automotive industry has provided gasoline engines with increasingly higher compression ratios to attain greater efficiency. One of the economically important ways in which the increased demands for higher octane fuels can be met is through the isomerization of the light naphtha components of such fuels.

It may be generally stated that the isoparaffinic and branched chain paraffin hydrocarbons are of greater commercial value to the petroleum industry than the corresponding straight chain hydrocarbons. Thus, for example, 2,2-dimethyl butane has a higher octane rating than the isomeric normal hexane.

The isomerization of normal paraffin hydrocarbons of from 5 to 7 carbon atoms into the corresponding branched chain homologs is well known. For effecting the isomerization, it is customary to employ certain metal halides, particularly aluminum chloride or aluminum bromide, in conjunction with certain promotors, such as hydrogen chloride, hydrogen bromide or boron fluoride. Insofar as the isomerization of light naphthas is concerned, the lower the temperature of isomerization, within limits, the more favorable is the equilibrium for converting straight chain paraffin hydrocarbons into isomers of high octane rating. Aluminum bromide has been found to be more active than aluminum chloride at lower isomerization temperatures, e.g. in the range of about 50° to about 120° F. The isomerization catalyst employed may be $AlBr_3$ supported on suitable carriers such as Porocel, bauxite, alumina, molybdena, molybdena-alumina, silica gel or the like. Alternatively, co-catalysts consisting of complexes of aluminum bromide with ketones, alcohols, ethers, amines, inorganic acids, water or halogenated hydrocarbons may be used. The co-catalysts, which are normally liquid at reactor temperature and are largely insoluble in hydrocarbon, may be employed in stirred reactors or in "pool" reactors wherein the hydrocarbon feed is passed by gravity flow upward through a pool of co-catalyst. Both of these catalyst systems have been found to convert naphtha to near thermodynamic equilibrium distribution of isomers in once-through operation.

An important problem arising with the use of these highly active catalysts is that they promote side reactions, such as cracking and disproportionation. These side reactions are particularly evident at high conversion conditions. Extensive cracking and disproportionation must be avoided since they cause severe catalyst deactivation. The side reaction problem is particularly serious in isomerization of heptanes.

It has in the past been proposed to minimize cracking by adding to the hydrocarbon feed to be isomerized, certain naphthenic hydrocarbons, such as cyclohexane, methyl cyclopentanes, methyl cyclohexanes, and the like. Similarly, isobutane has been added to minimize cracking. These inhibitors, though helpful, are not completely successful in suppressing cracking to the low level necessary to maintain satisfactory catalyst life. Again, this is particularly evident in the case of the higher molecular weight hydrocarbon such as heptanes.

An important problem isomerizing naphthas, and in particular, virgin naphthas, to high octane motor fuel is that the components, in particular the pentanes, hexanes, and heptanes, isomerize at different rates. Thus heptane isomerizes at a substantially faster rate than hexane, and the latter has a higher reaction rate than pentane. It has been found that in the isomerization of a $C_5$–$C_7$ naphtha in the presence of an $AlBr_3$-HBr support catalyst system and naphthalene and naphthalene/isobutane cracking suppressors, the reaction is selective to isomerization rather than to cracking or sludging, up to 90 to 92% conversion of hexane to isomers. Further severity results in cracking and catalyst deactivation. It has further been determined that it is optimum to convert pentane to 80% isopentane, and $C_7$ to 90% isoheptane to produce the highest octane number product without cracking and catalyst deactivation. This is an extremely difficult problem, because, under the same reaction conditions, the $C_7$ isomerization rate is twice that of $C_6$ isomerization and about 3.4 times that of the pentane isomerization rate. Thus, when a virgin $C_5$–$C_7$ naphtha is isomerized, the heptane reaches equilibrium conversion long before the hexane does, and the latter substantially before the pentane reaches equilibrium. For instance, when $C_7$ conversion to isoheptane is 90%, $C_6$ conversion is only 80% and $C_5$ conversion is only 60%.

It would be possible to obtain high conversion of the individual hydrocarbon by operating the process under conditions to obtain high conversion of heptane. This would be followed by separating unconverted normal pentane and hexane and recycling these to the reaction zone, either separately or together. Such a system, however, would be prohibitively expensive, for it would require one or more highly efficient, expensive superfractionation towers to separate isopentane from normal pentane, and isohexane from normal hexane, and hexanes and pentanes from the heptanes and frcm one another.

It is the principal object of the present invention to provide a means for effectively suppressing extensive cracking and disproportionation of hydrocarbons during isomerization in a high conversion Friedel-Crafts isomerization process so that the catalyst does not become deactivated in a manner such that high isomerization rates are effectively maintained.

It is a still further object of the present invention to provide conditions for isomerization so as to obtain maximum yields of the most desirable isomers at maximum rates while minimizing degradation of the isomerization product and catalyst.

Other and further objects and advantages of the present invention will appear hereinafter.

In accordance with the present invention, a hydrocarbon feed, such as a virgin naphtha, comprising normal paraffins of from 5 to 7 carbon atoms, is initially separated into its component hydrocarbons. Thus, if a $C_5$–$C_6$ hydrocarbon fraction is to be isomerized, it is fractionally distilled into a $C_5$ fraction and a $C_6$ fraction. If an under cut $C_5$–$C_7$ fraction is to be processed, it is fractionated into individual streams comprising essentially pentane, hexane, and heptane. These streams are then fed separately to a staged reactor or a series of reactors operated under conditions such that the pentane has the longest residence time and the heptane the shortest. Thus in one embodiment of the present invention, the pentane fraction is fed to a first reaction stage and reaction conditions controlled to isomerize to a yield of 50 to 60% isopentanes. This conversion is readily accomplished without encountering cracking or catalyst deactivation, even in the absence of naphthenic or isobutane cracking inhibitors. The total pentane product from this stage is passed to a second stage to which is fed the $C_6$ fraction from the distillation tower. This feed normally contains naphthene inhibitors occurring in the virgin naphtha, and isomerization is continued in this stage to a $C_6$ conversion of 75 to 85% isohexane, and the pentane fraction added in the first stage is converted to 60 to 70%. This is controlled by careful adjustment of reactor conditions. Finally, the heptane fraction is added to the third stage wherein, during a very brief residence time, equilibrium conversion is obtained without cracking or sludging. As will be seen more clearly hereinafter, each stage is carefully controlled as to reactor conditions, feed and product rates, and activity to obtain the desired conversion. As the feed concentrations vary in $C_5$, $C_6$ and $C_7$ hydrocarbons, these reactor stages can be varied to obtain equilibrium conversion on each fraction; temperature, promoter concentration, and stage size may be varied to obtain the desired goal. The reactor stages may be separate vessels or be segregated portions of a single reactor.

The nature and objects of the present invention will be more readily understood when reference is made to the schematic drawing depicting a flow plan of a suitable process embodying the principles of the present invention. The description is particularly directed to the use of aluminum bromide as the preferred catalyst, although the process is not to be limited thereto.

Referring now to the drawing, a feed stream comprising $C_5$–$C_7$ paraffinic hydrocarbons, preferably from which aromatics have been removed, is sent through line 10 into a splitter tower 12. Overhead a $C_5$ fraction is withdrawn through line 14, a $C_6$ fraction is withdrawn through line 16, and a $C_7$ fraction through line 18, respectively.

The pentane fraction is now passed to stage 1 of isomerization reactor 20 and a relatively low conversion, from 60 to 70% of the pentane feed, is obtained in this stage.

The reaction zone throughout the three stages may contain a bed of suitable support material for the aluminum bromide, such as alumina, silica, bauxite or the like, or it may contain a liquid catalyst consisting of a complex of aluminum bromide with an alcohol, ketone, amine, water, inorganic acids, halogenated hydrocarbons, or hydrocarbons. With the liquid aluminum halide complex catalyst some method such as an agitator must be provided for intimately contacting the liquid catalyst with the hydrocarbon feed. When employing a solid support such as alumina or bauxite for the aluminum bromide, the support will adsorb 10 to 80% aluminum bromide based on support weight. The supported aluminum bromide catalyst is formed by introducing aluminum bromide at 1 to 30 wt. percent concentration in the initial portion of the feed. The aluminum bromide complex catalyst may be formed externally and added to the reaction zone or it may be formed by adding the aluminum bromide at 1 to 30 wt. percent concentration in the initial portion of the feed. After formation of the supported or complexed aluminum bromide catalyst, the amount of aluminum bromide added in the feed may then be reduced to the quantity of $AlBr_3$ that will be converted to sludge in the process by undesirable side reactions. The aluminum bromide make-up may be added by dissolving the $AlBr_3$ in a portion of the hydrocarbon feed to be introduced through line 14.

Also introduced with the feed in an amount of hydrogen halide promoter sufficient to maintain a positive pressure of hydrogen halide of from 1 to 30 wt. percent in the reaction zone. Initially, this promoter is introduced through line 22 and after the process is under way, the major portion of the halide will be introduced through recycle line 34 while make-up promoter will enter through line 22.

If desired, isobutane is added to the feed in reactor 20 by recovering the isobutane from the product and recycling it through line 34 to the reaction zone. Furthermore, cracking suppressor naphthenes found in virgin naphthas may be introduced with the feed or separately through line 22. It is desired to maintain in reaction stage 2 from 2 to 50 vol. percent, based on feed to be isomerized, of naphthenes and from 25 to 100 vol. percent of isobutane. However, as pointed out, it is generally more desirable to add these cracking suppressors at later stages, since the pentane may be isomerized to the low conversion level of 60 to 70% without significant cracking.

The feed is conducted through stage 1 of reaction zone 20 at rates of the order of 0.1 to 4.0 v./v./hr. Reactor conditions include temperatures of 50° to 400° F., preferably 100° to 200° F.

The desired degree of conversion of $C_5$ in stage 1 is controlled by varying one or more of the following variables; v./v./hr., reactor temperature, and/or $AlBr_3$ or HBr in feed solution.

As pointed out previously, side reactions such as cracking and disproportionation are low at low conversions to high octane isomers. As conversion to the latter increases, the side reactions increase. With a virgin $C_5$–$C_6$ naphtha containing 10 to 20% naphthenes the cracking rate becomes competitive with the isomerization rate when the product contains about 92% isohexane based on the total paraffinic hexanes. Accordingly, along with the n-hexane fraction introduced into stage 2 of the reactor 20 there is added a cracking suppressor of the kind previously enumerated. A naphthene, such as methylcyclohexane or cyclohexane, may be added to the extent of 2 to 50%, preferably 10 to 20%, of the hexane; while isobutane may be similarly added to the extent of 10 to 500%, preferably 25 to 100%. These suppressors may be added to the feed along with the $C_5$ fraction as above, or be introduced through line 22.

The partially converted pentane fraction is now passed into stage 2 along with the fresh hexane, as well as the catalyst and promoter. The reaction conditions in stage 2 are similar to those in stage 1. However, they may differ depending on the relative concentrations of $C_5$ and $C_6$ paraffins in the feedstock being processed and the conversion level of these paraffins in said feedstock.

In the final stage 3 there is passed the fresh $C_7$ fraction from line 18 as well as the reaction products from stages 1 and 2. Here the reaction is carried out such that substantially equilibrium products are obtained of each fraction.

The reaction conditions in stage 3 are similar to those in stages 1 and 2. However, they may differ depending on the relative concentrations of $C_5$, $C_6$ and $C_7$ paraffins in the feedstock being processed and the conversion level of these paraffins in said feedstock.

The total isomerization product, which will contain some dissolved aluminum bromide, is removed from the reactor and conducted to a flash tower 24, wherein 50 to 95% of the product will be flashed overhead through line 25. This product will be hydrogen halide, isobutane and naphtha product. The bottoms from the flash zone, which contain dissolved aluminum bromide and hydrocarbons, are recycled through line 13 to the feed stream entering reactor 20 and thus will effect return of the catalyst to the reactor. Conditions in the flash zone are 50 to 200 mm. Hg vacuum to 500 p.s.i.g. and 100° to 400° F.

The product flashed overhead from tower 24 is conducted to a distillation tower 30, wherein the hydrogen halide promoter, together with the isobutane is distilled from the product and recycled through line 34 into the feed stream entering the reactor 20. Tower 30 may be operated at unit pressure or it may if desired be operated at lower pressures.

The hydrogen halide activators, of which hydrogen bromide is preferred, are necessary not only to promote the isomerization but also to prevent deactivation of the catalyst.

The process of the present invention may be subject to many variations without departing from its spirit. Thus, under certain conditions, it may be preferable to fractionate the virgin naphtha and, instead of isomerizing the $C_7$ fraction, send the latter to a catalytic hydroforming zone wherein it is converted to aromatic in the presence of a platinum catalyst and hydrogen. In such case only a two-stage isomerization process is necessary, the first stage converting the pentane to 60 to 75% isopentanes, and the second converting the partially converted pentanes as well as the n-hexane stream to equilibrium product of 92% $i-C_6$ and 80% $i-C_5$ without cracking. Furthermore, as an alternate, the third stage may be two separate vessels, the first operating at a temperature of 200° to 400° F. to complete the conversion to equilibrium, and the second at a temperature of 50° to 150° F. to obtain a more favorable product distribution. Equilibrium at lower temperatures is more favorable to higher conversion to isomers.

The following specific example illustrates the benefits to be derived from the process of the present invention.

*Example*

The advantages of operating in accordance with the described process were demonstrated in two laboratory bench scale experiments. In the first experiment, a $C_5$–$C_7$ fraction from a South Louisiana crude was reacted over $AlBr_3$-Porocel catalyst in the presence of HBr. In the second experiment, the $C_5/C_6$ cut of the $C_5$–$C_7$ fraction used in Experiment 1 was isomerized over $AlBr_3$-Porocel catalyst in the presence of HBr from 62% $C_6$ isomers on $C_6$ paraffins to 85% $C_6$ isomers. The partially converted $C_5/C_6$ cut was then blended with the $C_7$ from the original $C_5/C_7$ fraction. This material was then passed to a second reaction stage where the $C_6$ conversion was increased from 85 to 92%. The second experiment, which is in accordance with the described process, gave only 1% cracking while Experiment 1 gave 4% cracking. Data for these experiments are shown in the table below:

| | Experiment 1 | Experiment 2 |
|---|---|---|
| Feed: | | |
|   $C_5$ Conversion to Isomers, Vol. percent | 30 | 30 |
|   $C_6$ Conversion to Isomers, Vol. percent | 62 | 62 |
|   $C_7$ Conversion to Isomers, Vol. percent | 65 | 66 |
| Product of Reaction Stage 1: | | |
|   $C_5$ Conversion to Isomers, Vol. percent | | 49 |
|   $C_6$ Conversion to Isomers, Vol. percent | | 85 |
| Product of Reaction Stage 2: | | |
|   $C_5$ Conversion to Isomers, Vol. percent | 70 | 70 |
|   $C_6$ Conversion to Isomers, Vol. percent | 92 | 92 |
|   $C_7$ Conversion to Isomers, Vol. percent | 96 | 92 |
| Cracking to $C_4$ minus, Vol. percent | 4 | 1 |

A practical commercial isomerization process will tolerate up to about 1% cracking to $C_4$ minus. However, the 4% cracking shown in Experiment 1 will produce a very rapid catalyst deactivation rate which is not tolerable in a commercial process.

What is claimed is:

1. An improved process for isomerizing a light naphtha containing paraffinic hydrocarbons having from 5 to 7 carbon atoms into more highly branched isomers which comprises: separating a $C_5/C_6$ fraction and a $C_7$ fraction from said naphtha, isomerizing said first named fraction with an aluminum bromide comprising catalyst in a first liquid phase isomerization zone, controlling isomerization conditions of residence time, temperature, and feed rate to produce a product containing not more than 85% isohexane, based on $C_6$ paraffins, withdrawing said partially converted fraction and catalyst from said first stage and passing said mixture to a second stage isomerization zone, passing a naphthenic cracking suppressor and at least a portion of said $C_7$ fraction to said zone, continuing said isomerization process to produce an equilibrium reaction product from both fractions, and recovering a high octane product.

2. The process of claim 1 wherein said isomerization temperature is maintained in the range of from about 50° to about 150° F. and said feed rate at about 0.1 to 4.0 v./v./hr.

3. The process of claim 1 wherein about 2 to 50% of naphthenic hydrocarbons, based on hexane feed, is passed into said first and second zones.

4. The process of claim 1 wherein 25 to 100% isobutane, based on hexane, is passed into said first zone.

5. The process of claim 1 wherein said catalyst is $AlBr_3$ supported on a solid oxide carrier, and gaseous HBr is employed as a catalyst activator.

References Cited in the file of this patent
UNITED STATES PATENTS

| | | |
|---|---|---|
| 2,386,784 | Fragen | Oct. 16, 1945 |
| 2,443,607 | Evering | June 22, 1948 |
| 2,530,875 | Gwynn et al. | Nov. 21, 1950 |